(12) United States Patent
Song et al.

(10) Patent No.: US 10,190,003 B2
(45) Date of Patent: *Jan. 29, 2019

(54) DEGRADATION-RESISTANT SCALE INHIBITORS

(71) Applicant: Cytec Industries Inc., Woodland Park, NJ (US)

(72) Inventors: Airong Song, Larchmont, NY (US); Dannon Stigers, Milford, CT (US); Cory Bausch, Milford, CT (US)

(73) Assignee: Cytec Industries Inc. NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/578,972

(22) Filed: Dec. 22, 2014

(65) Prior Publication Data

US 2016/0108253 A1    Apr. 21, 2016

Related U.S. Application Data

(60) Provisional application No. 62/066,633, filed on Oct. 21, 2014.

(51) Int. Cl.
| | |
|---|---|
| *C09D 5/00* | (2006.01) |
| *C09D 5/16* | (2006.01) |
| *C01F 7/06* | (2006.01) |
| *C23F 14/02* | (2006.01) |
| *C02F 5/12* | (2006.01) |
| *C02F 5/10* | (2006.01) |

(52) U.S. Cl.
CPC ............ *C09D 5/1625* (2013.01); *C01F 7/064* (2013.01); *C02F 5/10* (2013.01); *C02F 5/125* (2013.01); *C23F 14/02* (2013.01)

(58) Field of Classification Search
CPC .......... C23F 14/02; C01F 7/14; C01F 7/0633; C01F 7/062; C01F 7/064
USPC ............................................... 423/118.1, 127
See application file for complete search history.

(56) References Cited

U.S. PATENT DOCUMENTS

| | | | |
|---|---|---|---|
| 4,731,259 A | 3/1988 | Lloyd | |
| 5,314,626 A | 5/1994 | Dimas | |
| 5,415,782 A | 5/1995 | Dimas | |
| 6,814,873 B2* | 11/2004 | Spitzer | C01F 7/0606 210/698 |
| 7,390,415 B2* | 6/2008 | Spitzer | C01F 7/0606 162/48 |
| 7,999,065 B2* | 8/2011 | Heitner | C08G 73/02 528/424 |
| 8,029,752 B2 | 10/2011 | La et al. | |
| 2004/0011744 A1* | 1/2004 | Spitzer | C01F 7/0606 210/698 |
| 2009/0099328 A1 | 4/2009 | Heitner et al. | |
| 2011/0076209 A1 | 3/2011 | La et al. | |
| 2011/0077185 A1 | 3/2011 | Cui | |
| 2011/0212006 A1 | 9/2011 | La et al. | |
| 2011/0220581 A1 | 9/2011 | Heitner et al. | |
| 2012/0148462 A1 | 6/2012 | Phillips et al. | |
| 2013/0032763 A1 | 2/2013 | Cui | |
| 2013/0189529 A1* | 7/2013 | Kildea | C01F 7/0606 428/446 |

FOREIGN PATENT DOCUMENTS

| | | |
|---|---|---|
| WO | 2005095477 A2 | 10/2005 |
| WO | 2008045677 A1 | 4/2008 |
| WO | 2004009606 A1 | 1/2009 |
| WO | 2006086189 A1 | 8/2009 |
| WO | 2013126683 A1 | 8/2013 |

OTHER PUBLICATIONS

V.G. Kazakov et al., Tsvetnye Metally/Non-Ferrous Metals; Intensifying The Vaporization of Soda-Alkaline Aluminate Solutions (1979) pp. 43-44.
V.G. Kazakov et al., Tsvetnye Metally/Non-Ferrous Metals; Heating and Evaporation of Silicone-Containing Aluminate Solutions (1979) pp. 45-48.
Spitzer et al., Max HT Sodalite Scale Inhibitor: Plant Experience and Impact on The Process; Light Metals 2008, 2008.

* cited by examiner

*Primary Examiner* — Steven J Bos (57) ABSTRACT

Methods for reducing aluminosilicate containing scale in an alumina recovery process involving treating an alumina recovery process equipment surface with a degradation-resistant scale inhibiting composition having high ionic strength prior to exposure to an alumina recovery process stream.

20 Claims, 1 Drawing Sheet

DEGRADATION-RESISTANT SCALE INHIBITORS

BACKGROUND OF THE INVENTION

Field of the Invention

This invention relates to methods of preventing or reducing aluminosilicate containing scale in an alumina recovery process stream.

Description of the Related Art

There are two processes for recovering alumina from raw bauxite ore, or bauxite; namely, the Bayer process and the sinter process. This includes blends of those two processes, as well as modifications of each process.

The Bayer process is an industrial process used to manufacture alumina from raw bauxite ore, or bauxite. Bauxite is principally composed of aluminum oxide ($Al_2O_3$), commonly referred to as alumina, as well as iron oxide and other impurities, commonly known as "red mud" due to the red color caused by the iron oxide. These additional impurities, present in minor amounts in the ore, include silica, aluminosilicate minerals and organic materials.

In the Bayer process, milled raw bauxite ore is first heated or digested with a highly caustic solution referred to as the digestion liquor. Digestion liquor generally includes a caustic solution of sodium hydroxide (NaOH) together with spent liquor recycled from the alumina precipitation process. This dissolution process is undertaken at high temperatures in order to fully dissolve all aluminum-bearing minerals, especially alumina trihydrate (gibbsite) and alumina monohydrate (boehmite and/or diaspore), yielding a supersaturated solution of sodium aluminate ($Al(OH)_4^- + Na^+$) or "pregnant liquor". Red mud iron oxides remain undissolved in this digestion liquor and must be removed prior to isolation of the purified alumina.

As mentioned above, bauxite ores used in the Bayer process also contain impurity minerals comprising silica in various forms and amounts, depending on the source of the bauxite. The caustic solution used to dissolve the aluminum minerals also dissolves part or all of the silica content of the bauxite, especially silica present in the form of aluminosilicate clays. The resulting concentrations of dissolved salts in the digestion liquor are very high, with sodium hydroxide concentrations typically being 150 grams/liter ('g/L') or greater, and dissolved alumina typically being 120 g/L or greater. Some of the silicate minerals rapidly dissolve in the digestion step to form solutions that are supersaturated with silica. At least part of this dissolved silica then reacts with the sodium aluminate ($Al(OH)_4^-$) present in solution to form insoluble complex hydrated sodium aluminum silicates, generally designated as desilication products, or "DSP".

This complex insoluble hydrated sodium aluminum silicates or DSP formed in the digestion process must be removed from the digestion liquor along with the red mud solids prior to isolation of the purified alumina product in the precipitation and calcination steps. Removal of red mud from the digestion or pregnant liquor is generally achieved by one or more solid-liquid separation steps involving sedimentation and/or filtration or other solids/liquid separation techniques, most often with the aid of a flocculant. Often, substantially all of the solids are removed from the digestion liquor; however, in some cases minor amounts of solids may not be separated from the liquor. Some of the silica that remains dissolved in the pregnant liquor can, at a later point in the process after removal of the solids, combine with aluminate ions to form insoluble complex aluminosilicate minerals such as sodalite or cancranite, which then have a tendency to precipitate out on the surfaces of Bayer process equipment as mineral scale.

After separation or filtration, the clarified pregnant liquor is then cooled and seeded with alumina trihydrate to precipitate a portion of the dissolved alumina in the form of alumina trihydrate ($Al(OH)_3$), which is then isolated by sedimentation and/or filtration before being calcined. After the alumina precipitation step, the remaining low solids solution (also called "spent liquor") is reheated and recycled to the digestion step. This process of heating low solids spent liquor prior to its addition to the bauxite ore in the digestion step is referred to in the industry as a "double stream process". As the spent liquor still contains dissolved aluminate and silicate anions, further processing of this liquor, especially heating, often causes deposition of aluminosilicate scales on the surface of Bayer process equipment such as heat exchangers. This scaling process poses a significant problem for the industry in that it can foul equipment and affect process efficiency.

In plants that operate a "single stream process", fresh bauxite is mixed with the spent liquor before going through the heat exchangers on the way to digestion. As such, in single stream processes the liquor that is exposed to heat exchanger surfaces also contains red mud solids originating from the freshly charged bauxite. Thus, in single stream processes, the Bayer process stream that is prone to scaling is now contaminated with significant amounts of undissolved red mud solids (i.e., a significantly higher solids content), which markedly reduces the efficacy of prior art scale inhibition processes, such as the double stream process describe above. The amount of undissolved red mud solids present in the heat exchanger liquor in a single stream plant can be as much as 30-150 g/l or more, versus 10 mg/L or less in a low solids double stream process. Thus, there is a need for improved methods of inhibiting scale formation on the surface of Bayer process equipment in single stream plants.

In heat exchangers used to reheat spent liquor, the high temperatures increase the rate of aluminosilicate precipitation. As a result, aluminosilicates form as scale on the inside walls of the heat exchangers and other associated process equipment. The scale is usually in the form of sodalite or cancrinite, but other aluminosilicate scales can form. This scale has low thermal conductivity compared to that of the steel walls, resulting in heat transfer being severely reduced as scale builds up. The reduction in heat transfer caused by aluminosilicate scaling can be so severe that the heat exchange units have to be taken out of service and cleaned frequently, as often as every one to two weeks. In addition to the obvious cost of maintenance and labor required to clean the scale from the heat exchangers, the impact of scale on the equipment can also be seen in increased energy consumption, reduced liquor flows, reduced throughput, reduced evaporation and even reduced production.

As described above, in a double stream process spent liquor is reheated in heat exchangers before it is contacted with fresh bauxite. Therefore, spent liquor in a double stream plant ordinarily does not contain large quantities (e.g., >10 mg/L) of insoluble solids such as red mud solids which may adversely affect the performance of scale inhibitors. However, in single stream plants (as well as some double stream plants, especially those that employ sand filters), red mud solids can be great enough (e.g., as much as 50-150 mg/L) to adversely affect scale inhibitor performance. Thus, there is also a need for improved methods of inhibiting scale formation on the surface of Bayer process equipment in double stream plants where the spent liquors contain undissolved solids, particularly higher concentrations of undissolved solids.

The sinter process is an alternative or adjuvant to the Bayer process, and is commonly used for the treatment of high silica-containing bauxites. In the sinter process, the bauxite (or "red mud") is calcined at 1200° C. with soda and/or lime prior to leaching with NaOH solution, generating sodium aluminate liquor (also commonly referred to as "supersaturated green liquor") and insoluble "sinter mud".

Bulk dosing (in situ) methods of applying scale inhibitors containing —Si(OR)$_n$ groups in alumina recovery processes, wherein n=1, 2 or 3, is known in the art. Such in situ methods include dosing "small molecule" scale inhibitors containing —Si(OR)$_n$ groups in the alumina recovery process.

In addition to dosing scale inhibitors containing —Si(OR)$_n$ groups, other techniques have included direct addition (bulk dosing) of methyl and ethyl siliconates to alumina recovery process liquor, as well as a variety of other compounds such as ammonium, aromatic amine, amine compounds, polymeric quaternary ammonium compounds, polyamine polymers, copolymers of acrylic acid and acrylamide, and polyacrylamides. Bulk dosing of silica particles and dosing of water-soluble polymers with carboxylic acid groups in Bayer liquor is also known.

Besides bulk dosing, other methods for reduction of aluminosilicate scale in alumina recovery process processes include a process of contacting at least a portion of at least one surface of at least one piece of alumina recovery process equipment with a scale inhibiting composition of matter in the absence of any liquor, wherein the scale inhibitor is a "small molecule" scale inhibitor containing —Si(OR)$_n$ groups.

Another process teaches pretreatment of surfaces of alumina recovery process equipment with thermosetting epoxy/urethane resins to inhibit scale formation. This coating process involves a curing reaction that is both laborious and time-consuming, and further requires use of a thick layer resin which could compromise heat transfer.

Regarding single stream processes, the publication Spitzer et al., *MAX HT Sodalite scale inhibitor: Plant experience and impact on the process*, LIGHT METALS (2008), pp. 57-62 describes the problem of ineffectiveness of scale inhibition in single streaming plants.

U.S. Patent Application No. 61/920,542 describes pretreatment of alumina recovery process equipment with silicon-containing scale inhibiting compositions, including polyethyleneimine (PEI)-based inhibitors wherein both silane and hydrophobe groups are connected with the PEI backbone via β-hydroxy ether linkages. In both single stream and double stream alumina heating and digestion units, process temperatures can range from about 100° C. to about 265° C. It has now been discovered that the β-hydroxy ether linkages are subject to degradation in process liquor at these high temperatures.

None of these prior art processes fully solve the problem of treating alumina recovery process streams economically. Further, the literature does not address the problem of scaling in single stream processes. There is also a need for degradation-resistant compositions useful in reducing or eliminating scale in high temperature alumina recovery processes, including Bayer single stream and Bayer double stream processes, as well as the sinter process. Thus, there is a need for improved methods of reducing or eliminating scale in alumina recovery processes for both single and double stream processes.

SUMMARY OF THE INVENTION

The present invention provides a method for reducing aluminosilicate containing scale in an alumina recovery process. This method includes identifying an alumina recovery process equipment surface that is subject to scale formation during the alumina recovery process. The surface of this process equipment is then contacted with a scale inhibiting composition in an amount effective to form a treated surface that is more resistant to scale formation upon subsequent contact with an alumina recovery process stream than an otherwise comparable untreated surface. The pretreated surface of the equipment is then contacted with the alumina recovery process stream. Suspended solids in the alumina recovery process stream can be present in an amount of about 0.01% to about 60% by weight, based on total weight of the alumina recovery process stream.

In contrast to prior art "in situ" methods of controlling scale, it has now been found that, in order to control scale formation of the surface of process equipment, it is not necessary to add a silicon-containing compound having one or more —Si(OR)$_n$ groups to the Bayer process stream if the surface of the steel equipment is first pretreated with a solution of the silicon-containing compound in a liquor having specific characteristics before being exposed to the Bayer process stream. Surprisingly, the liquor composition plays a significant role in controlling scale formation. It has also now been found that the liquor must contain a minimum level of dissolved salts in order for scale to be inhibited.

The scale inhibiting composition is a liquor comprising an aqueous solution of one or more water-soluble salts containing at least about 0.004% of total dissolved salts (TDS) and a silicon-containing degradation resistant compound having one or more —Si(OR)$_n$ groups, wherein n is an integer from 1 to 3. R can be H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1{}_4$; wherein each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl. This aqueous solution of one or more water-soluble salts preferably contains about 0.004% or more, more preferably 0.1% or more, more preferably at least about 1.0%, more preferably at least about 2.0%, even more preferably at least about 5.0% and most preferably at least about 10.0% by weight of total dissolved salts ('TDS'). Further, the silicon-containing compound is resistant to degradation in alumina recovery process streams at process temperatures from about 100° C. to about 265° C.

These and other embodiments are described in greater detail below.

DETAILED DESCRIPTION OF THE INVENTION

The term "Bayer process liquor" and similar terms are used herein in a manner consistent with their ordinary meaning as understood by those skilled in the art of the Bayer process. Thus, Bayer process liquor refers to various alumina-containing solutions present in the Bayer process.

The term "spent Bayer process liquor" or "spent liquor" and similar terms are used herein in a manner consistent with their ordinary meaning as understood by those skilled in the art and thus include Bayer process liquor streams remaining after the soluble alumina has been partially or wholly precipitated as solid alumina trihydrate from the liquor. After dissolution of the alumina from the bauxite and removal of insoluble waste material from the process stream, the soluble alumina is precipitated as solid alumina trihydrate, and the remaining caustic solution or spent liquor is then typically recycled back to earlier stages in the process and used to treat fresh bauxite. Spent liquor often has a low ratio of alumina concentration to caustic in the liquor.

The term "pregnant Bayer process liquor" and similar terms are used herein in a manner consistent with their ordinary meaning as understood by those skilled in the art and thus include Bayer process liquor after digestion and prior to precipitation. Pregnant liquor typically has a high ratio of alumina concentration to caustic concentration in the liquor.

The term "evaporated Bayer process liquor" and similar terms are used herein in a manner consistent with their ordinary meaning as understood by those skilled in the art and thus include spent liquor that has been evaporated to a higher caustic concentration.

The term "Synthetic Bayer Liquor" or SBL refers to a liquid used for laboratory experimentation having a composition with respect to alumina, soda, and caustic that is representative of Bayer process liquor.

The term "liquor" as used herein refers to an aqueous solution of one or more water-soluble salts containing at least 0.004% by weight of total dissolved salts (TDS).

"Amine" as used herein refers to a molecule containing one or more nitrogen atoms and having at least one secondary amine or primary amine group. Amines include monoamines such as methyl amine, ethylamine, octylamine, dodecylamine, and polyamines, defined herein below.

The term "polyamine" and similar terms are used herein in a manner consistent with their ordinary meaning as understood by those skilled in the art and thus include compounds having at least two amine units. The term includes simple diamines, triamines, tetramines, pentamines and hexamines, as well as molecules with higher molecular weight such as polyethyleneimine, which can have a molecular weight of many thousands or tens of thousands or even higher. For example, a polyamine can include a unit of the formula $-((CH_2)_r-NR^a_n)-$, where r is an integer in the range of 1 to about 20 and each $R^a_n$ is independently H, optionally substituted $C_1$-$C_{20}$ alkyl, optionally substituted $C_6$-$C_{12}$ aryl, optionally substituted $C_7$-$C_{20}$ aralkyl, or optionally substituted $C_2$-$C_{20}$ alkenyl. n is an integer from 1 to 3. The polyamine can comprise a $(NR^b_2)$-$J^a$-$(NR^b_2)$ moiety, wherein $J^a$ is an optionally substituted hydrocarbyl fragment having from about 2 to about 40 carbons; and each $R^b$ is independently H, optionally substituted $C_{1-8}$ alkyl, or optionally substituted $C_{6-10}$ aryl. In one embodiment, the hydrocarbyl fragment $J^a$ is optionally substituted $C_2$-$C_{20}$ alkyl, optionally substituted $C_2$-$C_{20}$ alkenyl group or optionally substituted $C_6$-$C_{20}$ aryl. In one embodiment, the polyamine is a $C_6$-$C_{20}$ aliphatic diamine. Examples of other suitable polyamines include polyethyleneimine, triethylenetetramine, tetraethylenepentamine, pentaethylenehexamine, 1,2-diaminoethane, 1,3-diaminopropane, diaminobutanes such as 1,4-diaminobutane, diaminopentanes such as 1,5-diaminopentane, diaminohexanes such as 1,5-diaminohexane, 2-methyl-4,4-dimethyl-1,6-hexanediamine, 2,2,4-trimethyl-1,6-hexanediamine, 1,8-diaminooctane, diaminoisophorone aminoaniline, and aminomethylbenzylamine, and reaction products of monoamines (e.g., ammonia, methylamine or dimethylamine) with epichlorohydrin, bisepoxides or ethylene dichloride.

The term "polymer" and similar terms are used herein in a manner consistent with their ordinary meaning as understood by those skilled in the art and thus include chemical compounds formed by combining small molecules known as monomers into a covalently bonded chain or network. These polymers may contain recurring structural units each containing two or more atoms. Many polymers have high molecular weights of about 500 or greater, while some polymers can have molecular weights of less than 500. Molecular weights are weight average molecular weights as determined by high pressure size exclusion chromatography (also referred to as gel permeation chromatography) using light scattering detection, unless otherwise indicated. The term "polymer" includes oligomers, copolymers and homopolymers.

The terms "hydrocarbon" and "hydrocarbyl" are broad terms that are used herein in their ordinary sense as understood by those skilled in the art, and thus include organic compounds or radicals consisting exclusively of the elements carbon and hydrogen. These moieties include alkyl, alkylene, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably have 1 to 40 carbon atoms. Hydrocarbyl radicals may be substituted with various groups that do not consist exclusively of the elements carbon and hydrogen, and thus a substituted hydrocarbyl radical may contain one or more heteroatoms such as oxygen and/or nitrogen.

The term "substituted", whether preceded by the term "optionally" or not, is a broad term that is used herein in its ordinary sense as understood by those skilled in the art. "Substituted" thus includes replacement of one or more hydrogen radicals in a given structure with one or more substituent groups, which may be any permissible organic substituents of the given structure. Examples of substituents that may be permissible for a given structure include hydroxy; $C_{1-10}$ alkyl; $C_{1-10}$ alkenyl; allyl; halogen; $C_{1-10}$ haloalkyl; $C_{1-10}$ alkoxy; hydroxy $C_{1-10}$ alkyl; carboxy; $C_{1-10}$ carboalkoxy (also referred to as alkoxycarbonyl); $C_{1-10}$ carboxyalkoxy; $C_{1-10}$ carboxamido (also referred to as alkylaminocarbonyl); cyano; formyl; $C_{1-10}$ acyl; nitro; amino; $C_{1-10}$ alkylamino; $C_{1-10}$ dialkylamino; anilino; mercapto; $C_{1-10}$ alkylthio; sulfoxide; sulfone; $C_{1-10}$ acylamino; amidino; phenyl; benzyl; heteroaryl; heterocycle; phenoxy; benzoyl; benzoyl substituted with amino, hydroxy, methoxy, methyl or halo; benzyloxy and heteroaryloxy. When the substituted group contains an alkyl segment, two hydrogen atoms on the same carbon atom may be replaced by a single substituent double bonded to the carbon atom (e.g., oxo (=O)).

"Alkylamine" means a group wherein the hydrogen atoms of ammonia are substituted with alkyl groups.

The term "reaction product" is used herein to mean the composition resulting from the reaction of two or more reactants.

The terms "alkyloxy" and "alkoxy" as used herein refer to the structure of $OX^a$ where $X^a$ is a hydrocarbon and O is oxygen. "Monoalkyloxy" means that attached to a silicon atom is one alkyloxy group. "Dialkyloxy" means that attached to a silicon atom are two alkyloxy groups. "Trialkyloxy" means that attached to a silicon atom are three alkyloxy groups.

"Alkylene" means an unsaturated, aliphatic hydrocarbon with one or more carbon-carbon double bonds.

Methods of Reducing Aluminosilicate Containing Scale

It now has been discovered that by treating the surface of a piece of Bayer process equipment with a scale inhibiting composition before that surface is contacted with a Bayer process stream, scale inhibition can be achieved at more economical dosages. Although this method of scale inhibition can be used in conjunction with other known methods, unlike other methods that involve directly adding or dosing scale inhibiting agents into the Bayer process stream (i.e., the "in situ" methods), the minimum dose of scale inhibitor required to prevent scale from forming on the surfaces of process equipment in the present method is significantly reduced. This method of treating the equipment surface with scale inhibiting composition prior to exposure to or contact with a Bayer process stream is particularly useful in single stream plants where the liquor contains high levels of suspended red mud solids prior to running through the heat exchanger, as well as in double stream plants where the Bayer process stream can be a Bayer liquor contaminated with solids such as red mud solids.

The method for reducing aluminosilicate containing scale in a Bayer process can include identifying or selecting a Bayer process equipment surface that is subject to scale formation during the Bayer process. The selected Bayer process equipment surface is then contacted with a scale inhibiting composition in an amount that is effective to form a treated surface that is more resistant to scale formation upon subsequent contact with a Bayer process stream than an otherwise comparable untreated surface. The treated surface is subsequently contacted with the Bayer process stream.

In processes according to the present invention, the Bayer process stream can include an amount of suspended solid in the range of about 0.01% to about 60% by weight, based on total weight of the Bayer process stream.

Various parts of the Bayer process equipment surface can be subjected to scale formation. For example, scale can form in the surface of interconnecting pipes, vessels, heat exchangers, valves, pumps and other equipment used in a Bayer process. The surface can be made of various materials. In some embodiments, the surface can be stainless steel. In other embodiments, the surface can be carbon steel.

Contacting the identified surface of the Bayer process equipment with the scale inhibiting composition can be performed using various methods. In some embodiments, the scale inhibiting composition can flow through and contact the identified Bayer process surface with agitation. In other embodiments, the contacting methods can include recirculating the scale inhibiting composition through the Bayer process equipment. Other methods of contacting the surface include but are not limited to brushing, soaking, and/or immersing the identified surface with the specific scale inhibiting composition.

When the Bayer process equipment surface is contacted with the scale inhibiting composition, some agitation or flow of the scale inhibiting composition can be applied during the treating period.

The Bayer process equipment surface can be treated with the scale inhibiting composition one or more times prior to exposure to the Bayer process stream. For example, the scale inhibiting composition can contact the Bayer process equipment surface one or more times, or the Bayer process equipment surface can be brushed with the scale inhibiting composition one or more times.

When a scale inhibiting composition is used to treat the Bayer process equipment surface, treating time can range from about 1 minute to about 24 hours. In some embodiments, treating time can range from about 4 hours to about 6 hours. In some embodiments, treating time can range from about 0.5 hour to about 4 hours.

Treating the identified surface of the Bayer process equipment with a scale inhibiting composition can be performed at different temperatures depending on the type and amount of scale inhibiting composition, structure of the silicon-containing compound, and treating time. In some embodiments, the treating step can be performed at room temperature; in others, at an elevated temperature. In some embodiments, the treating step can be performed at a temperature of from about 20° C. to about 200° C. In some embodiments, the treating step can be performed at a temperature of from about 50° C. to about 150° C. In some embodiments, the treating step can be performed at a temperature of from about 70° C. to about 125° C. In some embodiments, the treating step can be performed at a temperature of from about 90° C. to about 105° C. In some embodiments, the treating step can be performed at about 100° C. or less. Those skilled in the art recognize that, depending on the boiling point of the scale inhibiting composition, treating temperatures above about 100° C. generally involve pressurizing the Bayer process equipment (e.g., as illustrated in the examples below). The treated surface can then be contacted with the Bayer process stream with or without rinsing and/or drying.

The Bayer process equipment surface can be cleaned before being exposed to the scale inhibiting composition. In some embodiments, the Bayer process equipment surface can be scrubbed, brushed or acid-cleaned to remove any mineral scale that may have been previously deposited on the surface before being exposed to the scale inhibiting composition.

Scale Inhibiting Compositions

Various scale inhibiting compositions as described herein can be used. For example, in one embodiment, the scale inhibiting composition can comprise an aqueous solution of one or more water-soluble salts and a silicon-containing degradation resistant compound having one or more —Si(OR)$_n$ groups, wherein n is an integer from 1 to 3. R is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^1_4$; wherein each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl. In some embodiments, n is 3.

The aqueous solution of water-soluble salts preferably contains enough total dissolved salts ('TDS') to increase the ionic strength of the scale inhibiting composition. The aqueous solution of water-soluble salts can contain about 0.004% or more, preferably at least about 0.1%, more preferably at least about 1.0%, even more preferably at least about 2.0%, even more preferably at least about 5.0%, and most preferably at least about 10.0% by weight of total dissolved salts ('TDS').

The concentration of water-soluble salts or the ionic strength of the aqueous solution can vary depending on the type of scale inhibiting composition, the structure of the silicon containing compound used, and the Bayer process stream, but is generally greater than that of pure or deionized water.

Dissolved salts include salts of mineral and organic acids and basic compounds. The salts preferably have enough solubility in water so as to increase the ionic strength of the aqueous solution. The salts can include one or more cations and one or more anions. Examples of suitable cations include lithium, sodium, potassium, magnesium, calcium and aluminium. Sodium is preferred. Examples of anions include fluoride, chloride, bromide, acetate, aluminate, silicate, sulfate, nitrate, phosphate, borate, bromate, carbonate, chlorate, hydroxide and bicarbonate. Preferred salts contain ions commonly found in Bayer process liquors, such as sodium, calcium, hydroxide, aluminate, sulfate and carbonate.

In some embodiments, the aqueous solution of one or more water-soluble salts can be Bayer process liquor. More specifically, in some embodiments the aqueous solution of water-soluble salts is spent Bayer process liquor. In other embodiments, the aqueous solution of one or more water-soluble salts is evaporated Bayer process liquor. In other embodiments, the aqueous solution of one or more water-soluble salts is pregnant Bayer process liquor.

The pH of the aqueous solution can vary depending on the ions in the solution and the structure of the silicon containing degradation resistant compound used in the scale inhibiting composition. In some embodiments, the pH of the aqueous solution can be in a range from about 3 to about 14 or more. In some embodiments, the pH of the aqueous solution can be in a range from about 4 to about 14. In some embodiments, the pH of the aqueous solution can be in a range from about 5 to about 14. In some embodiments, the pH of the aqueous solution can be in a range from about 12 to about 14. In some embodiments, the pH of the aqueous solution can be 7 or higher. In some embodiments, the pH of the aqueous solution can be 12 or higher. In some embodiments, the pH of the aqueous solution can be that of Bayer process liquor (i.e., about 13.5 or higher).

Further, in some embodiments of the invention, no additional salts—over and above those necessary to adjust the pH—are required to be present in the treatment liquor. For example, aqueous NaOH can be used as the treatment liquor without addition of other, different salts. When no additional salts are present, the pH is preferably about 10.5 or greater, more preferably about 11.0 or greater. When additional salts are present, the pH can be optimized within a broader range for beneficial results. When additional salts are present, alkaline pH's of those greater than about 7 are preferred.

The amount of silicon-containing degradation resistant compound in the scale inhibiting composition can vary depending on the type of silicon-containing degradation resistant compound used, the ionic strength and/or pH of the solution in the scale inhibiting composition, and/or the ratio of volume of scale inhibiting composition to the surface area of Bayer process equipment. In some embodiments, the amount of silicon-containing degradation resistant compound present in the scale inhibiting composition is in a range of from about 10 milligrams/liter (mg/L) to about 2000 mg/L, with a preferred range of about 250 to about 1000 mg/L. In some embodiments, the amount of silicon-containing degradation resistant compound in the scale inhibiting composition is in a range of about 0.01% to about 25% by weight, based on total weight of the scale inhibiting composition.

Silicon-Containing Degradation Resistant Compound

Various silicon-containing degradation resistant compounds having one or more —Si(OR)$_n$ groups (wherein n is an integer from 1 to 3) can be used in the methods described herein. Silane-functionalized, polyamine-based scale inhibitors include polyethyleneimine (PEI)-based scale inhibitors and others compounds having a plurality of amine groups linked by hydrocarbyl chains, for example, compounds based on ethylenediamine. A common, often exemplified method of functionalization of such polyamine-based inhibitors is to react the polyamine with a glycidyl ether linked to a silane group (illustrated by Compound I below) so as to provide silane functionalization, and optionally, to also react the polyamine with a glycidyl ether linked to a hydrophobe group (illustrated by Compound II below):

In the above silane compound I and hydrophobe compound II, $Z^1$ and $Z^3$ are each independently a hydrocarbon group having a number of carbons in the range of 1 to 20 carbons. $Z^2$ is chosen from H, optionally substituted $C_1$-$C_{20}$ alkyl, optionally substituted $C_1$-$C_6$ aryl, optionally substituted $C_7$-$C_{20}$ aralkyl, optionally substituted $C_2$-$C_{20}$ alkenyl, Group I metal ion, Group II metal ion and $NR^1_4$; wherein each $R^1$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl.

The above method of functionalization with glycidyl ether compounds results in β-hydroxy ether linkages in the inhibitor as illustrated below:

In the above linkages, $A^1$ and $A^2$ are each independently a hydrocarbon group having a number of carbons in a range of 2 to 40; $Q^1$ is chosen from H and a hydrocarbon group having a number of carbons in a range of 1 to 20; $E^2$ is a hydrocarbon group having a number of carbons in a range of 1 to 20 carbons. $R^2$ is chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl. $J^2$ can be chosen from H and a hydrocarbon group having a number of carbons in a range of 1 to 20 carbons. v and w are integers from 0-3 wherein v+w=3.

It has now been discovered that improved performance via the above described pretreatment method is even further enhanced by changing the functionalization method of polyamine-based inhibitors so that β-hydroxy ether linkages are replaced with alkylamine linkages. While not desiring to be bound by theory, it is thought that the improved performance results from improved resistance to decomposition in Bayer liquor at high temperatures, for examples, temperatures of about 100° C. to about 265° C., preferably about 120° C. to about 200° C. That is, it is believed that the β-hydroxy ether linkages are subject to degradation (intramolecular alcoholysis) so as to chemically degrade the inhibitor and result in loss of performance. This degradation is depicted by the following equation—

The above described decomposition theory is supported by a headspace gas chromatography-mass spectrometry (GC-MS) study showing that a silane-functionalized polyethyleneimine (PEI)-based scale inhibitor containing β-hydroxy ether linkage between the PEI backbone and the hydrophobe, as illustrated by the following formula— n = 6 or 8 can undergo decomposition in Bayer liquor at high temperatures (e.g., about 100° C. to about 265° C.).

The above illustrated silicon-containing compound is the polymeric reaction product #7 disclosed in Table 9 at the top of column 18 of U.S. Pat. No. 7,999,065. The above compound was prepared according to the procedures disclosed in the '065 patent using the reactants polyethyleneimine, (3-glycidoxypropyl)trimethoxysilane (8.0 mole %) and octyl/decylglycidyl ether (10.0 mole %). Polyethyleneimine (Lupasol PR8515 from BASF, Ludwigshafen, Germany) (1.90 g) was mixed homogeneously with octyl/decyl glycidyl ether (1.00 g) and 3-(glycidyloxypropyl)trimethoxysilane (0.835 g). The mixture was heated at 100° C. overnight to give a solid gel. Aqueous NaOH solution (2 wt %) was then added to make a 5 wt % active solution, wherein the activity value of 5% is based on the weight of the gel (unhydrolyzed compound).

Figure 1:
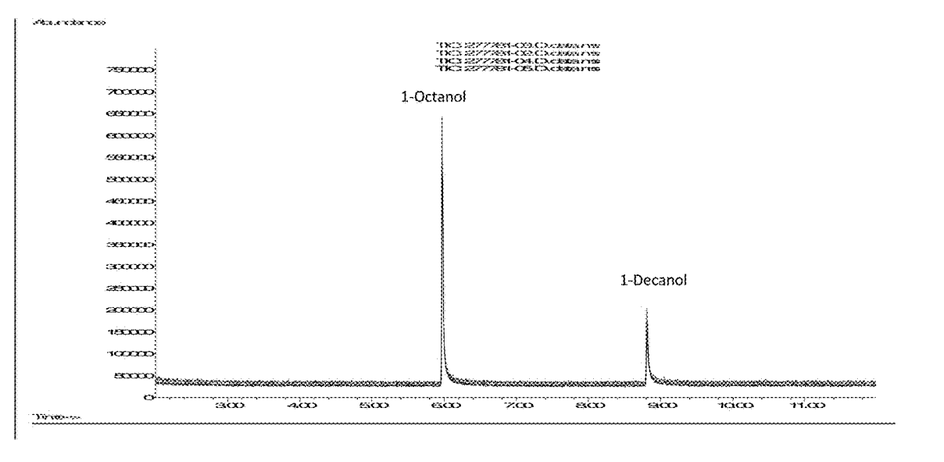
FIG. 1 is a chromatography-mass spectrometry analysis of the silicon-containing compound having β-hydroxy ether linkages that is the polymeric reaction product #7 disclosed in Table 9 at the top of column 18 of U.S. Pat. No. 7,999,065.

For the GC-MS study, the '065 compound was dissolved in synthetic Bayer liquor (SBL) at a concentration of 1 g/L. SBL was prepared as described in the Examples below. While the GC-MS trace did not initially show any peaks corresponding to the 1-octanol and 1-decanol, after heating at 100° C. for as little as 1 hour such peaks were clearly evident, indicating degradation of the β-hydroxy ether linkages. This is illustrated in FIG. 1. Therefore, for the present invention, degradation-resistant scale inhibitors have been developed by replacing the above described polyamine based scale inhibitors having β-hydroxy ether linkage with polyamine based scale inhibitors having alkylamine linkage which is free from β-hydroxy ether linkage, resulting in improved scale inhibition activity in a pretreatment method.

Preferred silane-functionalized compounds are water-soluble and are polyethyleneimine (PEI)-based. The compounds are made by silane functionalization with either or both of compounds III and IV, and optionally with either or both of compounds V and VI for hydrophobe functionalization as illustrated below—

$Z^1$ and $Z^3$ are as defined for compounds I and II above. X is F, Cl, Br or I.

In various embodiments, improved performance results from compounds having a) both silane and hydrophobe functionalization with compounds III and/or IV and V and/or VI, b) silane functionalization with compounds III and/or IV and optional hydrophobe-functionalization with compounds II above, or c) silane functionalization with compounds I above and hydrophobe functionalization with compounds V and/or VI.

From the above it is seen that various forms of silicon-containing compounds can be used in the scale inhibiting composition. In some embodiments, the silicon-containing compound can be a polymer or a polymeric reaction product. The scale inhibiting composition can include a mixture of various silicon-containing compounds, and the silicon-containing compounds can contain a mixture of silicon-containing groups. For example, those skilled in the art will understand that a polymer or polymeric reaction product described herein as containing a particular Si-containing unit can be a copolymer and thus can contain other units, including other Si-containing unit(s). Further, it has also been determined that optimum treatment liquor composition varies for each of the silicon containing compounds described herein. Thus, for each silicon containing compound, it is advantageous to determine the optimum levels and types of salts that should be employed in order to maximize the degree of scale inhibition.

The silicon-containing compound can be a polymer or polymeric reaction containing a unit of Formula VII and a unit of Formula VIII:

-continued wherein $A^3$ and $A^4$ are each independently a first optionally substituted hydrocarbyl radical containing from about 2 to about 40 carbons; $Q^3$ is a H or second optionally substituted hydrocarbyl radical containing from about 1 to about 20 carbons; $R^4$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2a}{}_4$, wherein each $R^{2a}$ is independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl; and $J^4$ is chosen from H and a hydrocarbon group having a number of carbons in the range of 1 to 20 carbons, wherein v and w are integers from 0 to 3 and v+w=3. The polymer or polymeric reaction product can have a weight average molecular weight of at least about 500.

The silicon-containing compound can also be a reaction product of at least a polyamine, a first nitrogen-reactive compound, and a second nitrogen-reactive compound. The first nitrogen-reactive compound contains a —$Si(OR^{1b})_3$ group and a nitrogen-reactive group, where $R^{1b}$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2b}{}_4$, each $R^{3b}$ being independently chosen from H, optionally substituted $C_1$-$C_{20}$ alkyl, optionally substituted $C_6$-$C_{12}$ aryl, optionally substituted $C_7$-$C_{20}$ aralkyl, and optionally substituted $C_2$-$C_{20}$ alkenyl. The second nitrogen-reactive compound contains a nitrogen-reactive group and does not contain a $Si(OR^{1b})_3$ group. At least one of the polyamine and the second nitrogen-reactive compound contains an optionally substituted hydrocarbyl radical containing from about 2 to about 40 carbons. The connecting groups between the polyamine and the first and second nitrogen-reactive compounds should be resistant to degradation in alumina recovery process stream liquors at high temperatures. Preferably, the connecting groups are alkylamine linkages. Preferably, the connecting groups are not β-hydroxy ether linkages. The reaction product can have a weight average molecular weight of at least about 500.

In some embodiments, the first nitrogen-reactive compound is chosen from ((chloromethyl)phenylethyl)-trimethoxysilane (including m and p isomers and combinations thereof), (p-chloromethyl)phenyltrimethoxy-silane, chloromethyltriethoxysilane, 3-chloropropyltriethoxysilane, 3-chloropropyltrimethoxysilane, 7-bromoheptyltrimethoxysilane, 3-bromopropyltrimethoxysilane, 11-bromoundecyltrimethoxysilane, 3-iodopropyltrimethoxysilane, 3-(trimethoxysilylpropyl)-2-bromo-2-methylpropionate, 2-(3,4-epoxycyclohexyl)ethyl-triethoxysilane, 2-(3,4-epoxycyclohexyl)ethyl-trimethoxysilane, 5,6-epoxyhexyltriethoxysilane, 3-isocyanatopropyltriethoxysilane, 3-isocyanatopropyltrimethoxy-silane, and (isocyanatomethyl)trimethoxysilane. Preferably, the first nitrogen-reactive compound is epoxyhexyltriethoxysilane or chloropropyltrimethoxysilane.

In some embodiments, the second nitrogen-reactive compound is chosen from alkyl halides, alkyl sulfates and alkyl epoxides.

In some embodiments, the second nitrogen-reactive compound is chosen from dimethylsulfate, chlorooctane, chlorohexane, benzyl chloride, epichlorohydrin, and $C_{8-10}$ alkyl halide.

EXAMPLES

In all examples, the synthetic Bayer liquor (SBL) used in the scaling tests contained 45 g/L $Al_2O_3$ (0.441M), 120.0 g/L NaOH (3.0M), 60 g/L $Na_2CO_3$ (0.566M), 20 g/L $Na_2SO_4$ (0.1408M) and 0.8 g/L $SiO_2$ for a total of 245.8 g/L or 24.58% wt/vol, of total dissolved salts. The no-Si synthetic Bayer liquor ("no-Si SBL") samples used for the pretreatment steps did not contain any silica. These no-Si SBL samples contained 45 g/L $Al_2O_3$ (0.441M), 120.0 g/L NaOH (3.0M), 60 g/L $Na_2CO_3$ (0.566M) and 20 g/L $Na_2SO_4$ (0.1408M), for a total of 245.0 g/L or 24.5% wt/vol. The pH of the no-Si SBL sample was 13.5.

Carbon-steel (grade SA-36) pressure vessels of 42 mL total volume ("bombs") manufactured by the STEM corporation were used to simulate scaling and scale inhibition in a piece of Bayer process equipment such as a heat exchanger. The bombs were filled with 30 mL of scale inhibiting composition (for the treating step) or SBL (for a "scaling run") and sealed so as to withstand pressure generated as a result of heating. Each bomb was pre-weighed to 0.1 mg after (1) cleaning (abrading) the inner surface with a rotating wire brush attached to a drill press, (2) blowing out debris via an air jet, and (3) allowing to cool to room temperature. The width of the brush used for cleaning the inner surface of the bomb was about the same as the inner diameter of the bomb.

Agitation during the treating step was provided by clamping the bomb to a carousel contained within a forced-draught oven and rotating at 30 rpm for a period of time, generally at 100° C.

After the treating step, the mixture was poured out and the bomb left to stand inverted on a paper towel for about 2 min to drain. The bomb was then filled with 30 mL of SBL containing red mud solids for a scaling run. After being sealed, the steel bomb was then subjected to one or more scaling runs.

For a single scaling run, the bomb was rotated on the carousel for 75 minutes at 150° C. After the scaling run was completed, the bomb was cooled to room temperature while still rotating on the carousel and then opened, rinsed with water, and dried under vacuum for 1 hour. The bomb was then weighed to within 0.1 mg. The tare weight was subtracted to obtain the mass of wall scale that had formed during the scaling run.

For multiple scaling runs, the bomb was opened after cooling, the contents of the bomb discarded, and the bomb then filled with 30 mL of fresh SBL without allowing the inner walls to dry. The bomb was then placed on the carousel for another run. This was repeated for the number of desired scaling runs. After the final run, wall scale was measured after rinsing and drying as described in the single run above.

Example 1—Effect of High Temperature on Scale Inhibition

Example 1 is a comparative example that illustrates the effect of application of an inhibitor containing an —$Si(OR)_3$ group for a pretreatment process according to the present invention for single or double stream applications at high temperature with high solids content (red mud solids present).

For the pretreatment runs of Examples 1.1, the pretreatment liquor was no-Si SBL with a pH of 13.5. The bomb was treated with the inhibitor solution for 16 hours at a temperature of 100° C. The scaling run results were compared against a bomb that was treated with no-Si SBL containing no scale inhibitor and then subjected to three scaling runs.

The inhibitor solution of Example 1.1 was prepared as follows. The silicon containing compound used was the polymeric reaction Product #7 as disclosed in Table 9 at the top of col. 18 of U.S. Pat. No. 7,999,065, having units of Formula (I) and units of Formula (II). This compound used in Example 1.1 was prepared in accordance with the procedures disclosed in U.S. Pat. No. 7,999,065 using polyethyleneimine, glycidoxypropyltrimethoxysilane (8.0 mole %) and octyl/decylglycidyl ether (10.0 mole %) reactants. This compound does not have degradation-resistant linkages; rather, it has thermally unstable β-hydroxy linkages. The compound was added, with stirring, to the no-Si SBL to form the scale inhibiting composition used in the treating step.

For the pretreatment run of Example 1.1, 30 mL of no-Si SBL was added to the bomb followed by 600 μL of the 5.0% w/w inhibitor solution to create a 1000 mg/L inhibitor solution (1 μL=1 mg). The bomb was then treated with this solution for 16 hours at a temperature of 100° C. The scaling run results were compared against a bomb that was treated with no-SBL containing no scale inhibitor (i.e., a blank) and then subjected to three scaling runs.

For the three scaling runs of Example 1.1, the scaling run liquor was SBL containing red mud solids (400 mg/l). Each scaling run was run at a temperature of 150° C. for 1.25 hours. The reduction in wall scale for Example 1 was compared against the blank. The results are provided in Table 1.

TABLE 1

Example 1 Scaling Run Results

| Test # | Pretreatment liquor pH | Wall scale amount (mgs) | % reduction in wall scale |
|---|---|---|---|
| Blank | N/A | 47.4 | N/A |
| 1.1 | 13.5 | 20.8 | 56.1 |

This Example shows that for a pretreatment dose of 1000 mg/L of the inhibitor in no-Si SBL followed by 3 scaling runs in SBL with 400 mg/L red mud solids at 150° C., around 56% wall scale inhibition is achieved.

Example 2—Effect of High Temperature on Scale Inhibition

Example 2 illustrates the effect of application of two different degradation-resistant inhibitors containing an —Si(OR)₃ group versus the effect of application of two different inhibitors that are not degradation resistant for a pretreatment process according to the present invention for single or double stream applications at high temperature with high solids content (red mud solids present).

For the pretreatment runs of Examples 2.1-2.4, the pretreatment liquor was no-Si SBL with a pH of 13.5. Examples 2.1 and 2.2 are inhibitors according to the present invention, whereas Examples 2.3 and 2.4 are comparative (i.e., they are inhibitors having thermally unstable β-hydroxy ether linkage between the PEI and the hydrophobe, but have degradation resistant amine linkages between the PEI and the silane). Examples 2.1 and 2.4 have the same mole % of hydrophobe and silane groups (based on PEI recurring unit weight). Likewise, Examples 2.2 and 2.5 have the same mole % of hydrophobe and silane groups (based on PEI recurring unit weight). This is illustrated in Table 2.1 below. The bomb was treated with the inhibitor solution for 16 hours at a temperature of 100° C. The scaling run results were compared against a bomb that was treated with no-Si SBL containing no scale inhibitor (blank) and then subjected to three scaling runs.

TABLE 2.1

Compositions of silicon-containing compounds

| Example | PEI MW | Hydrophobe | Silane | Mol % hydrophobe | Mol % silane |
|---|---|---|---|---|---|
| 2.1 | 2000 | 1-chlorooctane | (3-chloropropyl)trimethoxysilane | 10 | 6 |
| 2.2 | 2000 | 1-chlorooctane | (3-chloropropyl)trimethoxysilane | 10 | 12 |
| 2.3 | 2000 | octyl/decyl glycidyl ether | (3-chloropropyl)trimethoxysilane | 10 | 6 |
| 2.4 | 2000 | octyl/decyl glycidyl ether | (3-chloropropyl)trimethoxysilane | 10 | 12 |

The inhibitor solution of Example 2.1 was prepared as follows. 1.7447 g polyethylenimine ($M_w$ about 2000) was mixed with 0.6032 g 1-chlorooctane and 0.4838 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 2.2 was prepared as follows. 1.7955 g polyethylenimine ($M_w$ about 2000) was mixed with 0.6208 g 1-chlorooctane and 0.9957 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 2.3 was prepared as follows. 2.2349 g polyethylenimine ($M_w$ about 2000) was mixed with 1.1767 g octyl/decyl glycidyl ether and 0.6197 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 2.4 was prepared as follows. 2.3426 g polyethylenimine ($M_w$ about 2000) was mixed with 1.2334 g octyl/decyl glycidyl ether and 1.2991 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

For the three scaling runs of each of Example 2.1-2.4, the scaling run liquor was SBL containing red mud solids (400 mg/L). Each scaling run was run at a temperature of 150° C. for 1.25 hours. The reduction in wall scale for Example 2 was compared against the blank. The results are provided in Table 2.2.

TABLE 2.2

Example 2 Scaling Run Results
Comparison of Different Scale Inhibitors used in Pretreatment

| Test # | Pretreatment liquor pH | Wall scale amount (mgs) | % reduction in wall scale |
|---|---|---|---|
| Blank | N/A | 54.6 | N/A |
| 2.1 | 13.5 | 15.6 | 71.4 |
| 2.2 | 13.5 | 19.4 | 64.5 |
| 2.3 | 13.5 | 51.5 | 5.7 |
| 2.4 | 13.5 | 41.1 | 24.7 |

This example demonstrates that pretreatment with the inhibitors of Examples 2.1 and 2.2 containing degradation-resistant linkage (amine bonds) between PEI and hydrophobe and PEI and silane is more efficient in inhibiting wall scale formation than inhibitors according to Examples 2.3 and 2.4 containing thermally unstable β-hydroxy ether linkages between the PEI and the hydrophobe.

Example 3—Effect of High Temperature on Scale Inhibition

Example 3 illustrates the effect of application of six different degradation-resistant compound inhibitors containing an —Si(OR)$_3$ group for a pretreatment process according to the present invention for single or double stream applications at high temperature with high solids content (red mud solids present).

For the pretreatment runs of Examples 3.1-3.6, the pretreatment liquor was no-Si SBL with a pH of 13.5. The bomb was treated with the inhibitor solution for 16 hours at a temperature of 100° C. The scaling run results were compared against a bomb that was treated with no-Si SBL containing no scale inhibitor (blank) and then subjected to three scaling runs.

The inhibitor solution of Example 3.1 was prepared as follows. 2.8383 g polyethyleneimine ($M_w$ about 1800) was mixed with 0.4178 g benzyl chloride and 0.787 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 3.2 was prepared as follows. 3.4749 g polyethyleneimine ($M_w$ about 1800) was mixed with 0.5115 g benzyl chloride and 1.9271 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 3.3 was prepared as follows. 3.0563 g polyethyleneimine ($M_w$ about 1800) was mixed with 0.6748 g benzyl chloride and 0.8475 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 3.4 was prepared as follows. 2.1960 g polyethyleneimine ($M_w$ about 1800) was mixed with 0.4848 g benzyl chloride and 1.2178 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 3.5 was prepared as follows. 2.6787 g polyethyleneimine ($M_w$ about 1800) was mixed with 0.7885 g benzyl chloride and 0.7428 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 3.6 was prepared as follows. 2.2522 g polyethyleneimine ($M_w$ about 1800) was mixed with 0.6630 g benzyl chloride and 1.2490 g (3-chloropropyl)trimethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

For the three scaling runs of each of Examples 3.1-3.6, the scaling run liquor was SBL containing red mud solids (400 mg/L). Each scaling run was run at a temperature of 150° C. for 1.25 hours. The reduction in wall scale for Example 3 was compared against the blank. The results are provided in Table 3.

TABLE 3

Example 3 Scaling Run Results

| Test # | Pretreatment liquor pH | Wall scale amount (mgs) | % reduction in wall scale |
|---|---|---|---|
| Blank | N/A | 48.5 | N/A |
| 3.1 | 13.5 | 2.2 | 95.5 |
| 3.2 | 13.5 | 2.7 | 94.4 |
| 3.3 | 13.5 | 3.5 | 92.8 |
| 3.4 | 13.5 | 9.0 | 81.4 |
| 3.5 | 13.5 | 0.0 | 100.0 |
| 3.6 | 13.5 | 14.3 | 70.5 |

Example 3 shows that pretreatment with various benzyl-modified inhibitors according to the present invention containing degradation-resistant linkages (amine bonds) between the PEI and the hydrophobe can efficiently inhibit wall scale formation at high temperatures.

Example 4—Effect of High Temperature on Scale Inhibition

Example 4 illustrates the effect of application of nine different degradation-resistant compound inhibitors containing an —Si(OR)$_3$ group for a pretreatment process according to the present invention for single or double stream applications at high temperature with high solids content (red mud solids present).

For the pretreatment runs of Examples 4.1-4.9, the pretreatment liquor was no-Si SBL with a pH of 13.5. The bomb was treated with the inhibitor solution for 16 hours at a temperature of 100° C. The scaling run results were compared against a bomb that was treated with no-Si SBL containing no scale inhibitor and then subjected to three scaling runs. For Example 4, one bomb treated with no-Si SBL containing no scale inhibitor (blank) was compared against Examples 4.1 and 4.2, and a separate bomb treated with no-Si SBL containing no scale inhibitor (blank) was compared against Examples 4.3-4.9 as shown in Table 4 below.

The inhibitor solution of Example 4.1 was prepared as follows. 0.5387 g polyethylenimine ($M_w$ about 1800) was mixed with 0.0728 g propylene oxide and 0.1973 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 4.2 was prepared as follows. 0.6030 g polyethyleneimine ($M_w$ about 1800) was mixed with 0.0814 g propylene oxide and 0.3312 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 4.3 was prepared as follows. 0.7317 g polyethylenimine ($M_w$ about 1800) was mixed with 0.0988 g propylene oxide and 0.5358 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 4.4 was prepared as follows. 0.5059 g polyethyleneimine ($M_w$ about 1800) was mixed with 0.1367 g propylene oxide and 0.1852 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 4.5 was prepared as follows. 0.5781 g polyethyleneimine ($M_w$ about 1800) was mixed with 0.1562 g propylene chloride and 0.3175 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 4.6 was prepared as follows. 0.5341 g polyethyleneimine ($M_w$ about 1800) was mixed with 0.1443 g propylene oxide and 0.3911 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 4.7 was prepared as follows. 0.6987 g polyethyleneimine ($M_w$ about 1800) was mixed with 0.2831 g propylene oxide and 0.2558 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 µL of the 5.0% w/w inhibitor solution to create a 1000 mg/L inhibitor solution for pretreatment of the bomb (1 µL=1 mg).

The inhibitor solution of Example 4.8 was prepared as follows. 0.6364 g polyethyleneimine ($M_w$ about 1800) was mixed with 0.2579 g propylene oxide and 0.3495 g (5,6- epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 m/1 inhibitor solution for pretreatment of the bomb (1 μL=1 mg).

The inhibitor solution of Example 4.9 was prepared as follows. 0.7510 g polyethyleneimine ($M_w$ about 1800) was mixed with 0.3046 g propylene oxide and 0.5505 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

For the three scaling runs of each of Examples 4.1-4.9, the scaling run liquor was SBL containing red mud solids (400 mg/L). Each scaling run was run at a temperature of 150° C. for 1.25 hours. The reduction in wall scale for Examples 4.1 and 4.2 was compared against the first blank in Table 4, while the reduction in scale for Examples 4.3 to 4.9 was compared against the second blank in Table 4. The average results of the three runs are provided in Table 4.

TABLE 4

Example 4 Scaling Run Results

| Test # | Pretreatment liquor pH | Wall scale amount (mgs) | % reduction in wall scale |
|---|---|---|---|
| Blank | 13.5 | 53.4 | 0.0 |
| 4.1 | 13.5 | 19.5 | 63.5 |
| 4.2 | 13.5 | 18.5 | 65.0 |
| Blank | 13.5 | 52.8 | 0.0 |
| 4.3 | 13.5 | 14.1 | 73.0 |
| 4.4 | 13.5 | 5.8 | 89.0 |
| 4.5 | 13.5 | 10.9 | 79.0 |
| 4.6 | 13.5 | 38.4 | 27.0 |
| 4.7 | 13.5 | 4.7 | 91.0 |
| 4.8 | 13.5 | 29.4 | 44.0 |
| 4.9 | 13.5 | 18.2 | 66.0 |

This Example 4 demonstrates that pretreatment with epoxy-modified inhibitors containing degradation-resistant linkages (β-hydroxyamine bonds) between the PEI and hydrophobe and between the PEI and silane, can significantly reduce the amount of wall scale after 3 scaling runs in SBL with 400 mg/L red mud solids at 150° C.

Example 5—Effect of High Temperature on Scale Inhibition

Example 5 illustrates the effect of application of five different degradation-resistant compound inhibitors containing an —Si(OR)$_3$ group for a pretreatment process according to the present invention for single or double stream applications at high temperature with high solids content (red mud solids present).

For the pretreatment runs of Examples 5.1-5.5, the pretreatment liquor was no-Si SBL with a pH of 13.5. The bomb was treated with the inhibitor solution for 16 hours at a temperature of 100° C. The scaling run results were compared against a bomb that was treated with no-Si SBL containing no scale inhibitor (blank) and then subjected to three scaling runs.

The inhibitor solution of Example 5.1 was prepared as follows. 0.6362 g polyethyleneimine ($M_w$ about 1800) was mixed with 0.0948 g 1,2-epoxyoctane and 0.233 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 5.2 was prepared as follows. 0.7548 g polyethyleneimine ($M_w$ about 1800) was mixed with 0.1125 g 1,2-epoxyoctane and 0.4146 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 5.3 was prepared as follows. 0.5926 g polyethylenimine ($M_w$ about 1800) was mixed with 0.0883 g 1,2-epoxyoctane and 0.4340 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 5.4 was prepared as follows. 0.7558 g polyethyleneimine ($M_w$ about 1800) was mixed with 0.2254 g 1,2-epoxyoctane and 0.2767 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 5.5 was prepared as follows. 0.8132 g polyethyleneimine ($M_w$ about 1800) was mixed with 0.2425 g 1,2-epoxyoctane and 0.4467 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

For the three scaling runs of each of Examples 5.1-5.5, the scaling run liquor was SBL containing red mud solids (400 mg/L). Each scaling run was run at a temperature of 150° C.

for 1.25 hours. The reduction in wall scale for each of Examples 5.1 to 5.5 was compared against the blank, and the result is provided in Table 5.

TABLE 5

Example 5 Scaling Run Results

| Test # | Pretreatment liquor pH | Wall scale amount (mgs) | % reduction in wall scale |
|---|---|---|---|
| Blank | 13.5 | 48.7 | 0.0 |
| 5.1 | 13.5 | −4.3 | 109.0 |
| 5.2 | 13.5 | 20.9 | 57.0 |
| 5.3 | 13.5 | 38.1 | 22.0 |
| 5.4 | 13.5 | 36.2 | 26.0 |
| 5.5 | 13.5 | 39.5 | 19.0 |

This example demonstrates that pretreatment with epoxy-modified compounds containing degradation-resistant linkage (β-hydroxyamine bonds) between PEI and hydrophobe and between PEI and silane, can significantly reduce the amount of wall scale after 3 scaling runs in SBL with 400 mg/L red mud solids at 150° C.

Example 6—Effect of High Temperature on Scale Inhibition

Example 6 illustrates the effect of application of five different degradation-resistant compound inhibitors containing an —Si(OR)$_3$ group for a pretreatment process according to the present invention for single or double stream applications at high temperature with high solids content (red mud solids present).

For the pretreatment runs of Examples 6.1-6.5, the pretreatment liquor was no-Si SBL with a pH of 13.5. The bomb was treated with the inhibitor solution for 16 hours at a temperature of 100° C. Each scaling run result was compared against a bomb that was treated with no-Si SBL containing no scale inhibitor (blank) and then subjected to three scaling runs. For Example 6, one bomb treated with no-Si SBL containing no scale inhibitor was compared against Examples 6.1-6.3, a second separate bomb treated with no-Si SBL containing no scale inhibitor was compared against Example 6.4, and a third separate bomb treated with no-Si SBL containing no scale inhibitor was compared against Example 6.5 as shown in Table 6 below.

The inhibitor solution of Example 6.1 was prepared as follows. 0.4232 g polyethyleneimine ($M_w$ about 1800) was mixed with 0.0363 g 1,2-epoxydodecane and 0.155 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 6.2 was prepared as follows. 0.5561 g polyethyleneimine ($M_w$ about 1800) was mixed with 0.0477 g 1,2-epoxydodecane and 0.3054 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 6.3 was prepared as follows. 0.4248 g polyethyleneimine ($M_w$ about 1800) was mixed with 0.0728 g 1,2-epoxydodecane and 0.1555 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 6.4 was prepared as follows. 0.5006 g polyethyleneimine ($M_w$ about 1800) was mixed with 0.0858 g 1,2-epoxydodecane and 0.2750 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

The inhibitor solution of Example 6.5 was prepared as follows. 0.4473 g polyethyleneimine ($M_w$ about 1800) was mixed with 0.1150 g 1,2-epoxydodecane and 0.1638 g (5,6-epoxyhexyl)triethoxysilane, and the resulting mixture was heated at 100° C. for 18 hours, giving the desired polymer as a soft friable gel. Aqueous NaOH solution (2 wt %) was then added to make a 5.0 wt % solution, wherein the activity value of 5% is based on the weight of the gel (unhydrolyzed compound). 30 mL of no-Si SBL was added to the bomb followed by 600 μL of the 5.0% w/w inhibitor solution to create a 1000 mg/L inhibitor solution for pretreatment of the bomb (1 μL=1 mg).

For each of the three scaling runs of Example 6.1-6.5, the scaling run liquor was SBL containing red mud solids (400 mg/l). Each scaling run was run at a temperature of 150° C. for 1.25 hours. The reduction in wall scale for each of Examples 6.1 and 6.2 was compared against the blank as described above, with the results provided in Table 6.

TABLE 6

Example 6 Scaling Run Results

| Test # | Pretreatment liquor pH | Wall scale amount (mgs) | % reduction in wall scale |
|---|---|---|---|
| Blank | 13.5 | 52.8 | 0.0 |
| 6.1 | 13.5 | 11.6 | 78.0 |
| 6.2 | 13.5 | 30.0 | 43.0 |
| 6.3 | 13.5 | 23.4 | 56.0 |
| Blank | 13.5 | 46.4 | 0.0 |
| 6.4 | 13.5 | 25.6 | 45.0 |
| Blank | 13.5 | 45.9 | 0.0 |
| 6.5 | 13.5 | 6.9 | 85.0 |

Example 6 demonstrates that pretreatment with epoxy-modified inhibitors containing degradation-resistant linkage (β-hydroxyamine bonds) between PEI and hydrophobe and PEI and silane, can significantly reduce the amount of wall scale after 3 scaling runs in SBL with 400 mg/L red mud solids at 150° C.

Example 7

Headspace GC-MS of compound in Example 1 in no-Si SBL is conducted as follows. 2 mL of the no-Si SBL solution of compound 1 (1000 mg/L) was added to 20 mL headspace vials. Vials were sealed and heated to 100° C. for required time. The 500 μL headspace of the sample was withdrawn and analyzed by GC/MS. The results are provided in FIG. 1.

While the invention has been described with what are considered to be preferred embodiments, it is to be understood that the invention is not limited to the disclosed embodiments, but is intended to cover various modifications and equivalent arrangements included within the scope of the appended claims, and that the invention also contemplates multiply dependent embodiments of the appended claims where appropriate.

What is claimed is:

1. A method of reducing aluminosilicate containing scale in a Bayer process, comprising:
   identifying a Bayer process equipment surface that is subject to scale formation during the Bayer process;
   contacting the identified Bayer process equipment surface with an amount of a scale inhibiting composition effective to form a treated surface that is more resistant to scale formation upon subsequent contact with a Bayer process stream than an otherwise comparable untreated surface; and
   contacting the treated surface with the Bayer process stream;
   wherein the scale inhibiting composition comprises a liquor comprising an aqueous solution of one or more water-soluble salts having at least about 0.004% by weight of total dissolved salts and a silicon-containing compound,
   wherein the silicon-containing compound is resistant to degradation in alumina recovery process streams at process temperatures from about 100° C. to about 265° C.,
   wherein the silicon-containing compound is a reaction product of at least a polyamine, a first nitrogen-reactive compound and a second nitrogen-reactive compound, wherein:
   the first nitrogen-reactive compound comprises a —Si(OR$^{1b}$)$_3$ group and a nitrogen-reactive group, where R$^{1b}$ is H, optionally substituted C$_1$-C$_{20}$ alkyl, optionally substituted C$_6$-C$_{12}$ aryl, optionally substituted C$_7$-C$_{20}$ aralkyl, optionally substituted C$_2$-C$_{20}$ alkenyl, Group I metal ion, Group II metal ion, or NR$^{2b}$$_4$, each R$^{2b}$ being independently selected from H, optionally substituted C$_1$-C$_{20}$ alkyl, optionally substituted C$_6$-C$_{12}$ aryl, optionally substituted C$_7$-C$_{20}$ aralkyl, or optionally substituted C$_2$-C$_{20}$ alkenyl;
   the second nitrogen-reactive compound comprises a nitrogen-reactive group and does not contain a —Si(OR$^{1b}$)$_3$ group, and
   wherein the silicon-containing compound is free of β-hydroxy ether groups.

2. The method of claim 1 wherein the second nitrogen-reactive compound comprises an optionally substituted hydrocarbyl radical containing from 2 to about 40 carbons.

3. The method of claim 1 wherein the aqueous solution of one or more water-soluble salts is Bayer process liquor.

4. The method of claim 3 wherein the Bayer process liquor is chosen from spent Bayer process liquor, evaporated Bayer process liquor or pregnant Bayer process liquor.

5. The method of claim 1 wherein the aqueous solution of one or more water-soluble salts comprises at least 0.1 weight % of total dissolved salts.

6. The method of claim 5 wherein the aqueous solution of water-soluble salts comprises at least 5.0% by weight of total dissolved salts.

7. The method of claim 1, wherein the first nitrogen-reactive compound is chosen from ((chloromethyl)phenylethyl)-trimethoxysilane, (p-chloromethyl)phenyltrimethoxy-silane, chloromethyltriethoxysilane, 3-chloropropyltriethoxysilane, 3-chloropropyltrimethoxysilane, 7-bromoheptyltrimethoxysilane, 3-bromopropyltrimethoxysilane, 11-bromoundecyltrimethoxysilane, 3-iodopropyltrimethoxysilane, 3-(trimethoxysilylpropyl)-2-bromo-2-methylpropionate, 2-(3,4-epoxycyclohexyl)ethyltriethoxysilane, 2-(3,4-epoxycyclohexyl)ethyltrimethoxysilane, 5,6-epoxyhexyltriethoxysilane, 3-isocyanatopropyltriethoxysilane, 3-isocyanatopropyltrimethoxy-silane, or (isocyanatomethyl)trimethoxysilane.

8. The method of claim 1, wherein the second nitrogen-reactive compound is chosen from alkyl halides, alkyl sulfates or alkyl epoxides.

9. The method of claim 8, wherein the second nitrogen-reactive compound is chosen from dimethylsulfate, chlorooctane, chlorohexane, benzyl chloride, epichlorohydrin, or C$_{8-10}$ alkyl halide.

10. The method of claim 7, wherein the first nitrogen-reactive compound is chosen from (3-chloropropyl)trimethoxysilane or (5,6-epoxyhexyl)triethoxysilane.

11. The method of claim 1, wherein the reaction product has a weight average molecular weight of at least about 500.

12. The method of claim 7, wherein the second nitrogen-reactive compound comprises an optionally substituted hydrocarbyl radical containing from 2 to about 40 carbons.

13. The method of claim 1, wherein the silicon-containing compound is a reaction product of an amine-containing molecule and an amine-reactive molecule containing at least one amine-reactive group per molecule and at least one —Si(OR$^{5e}$)$_n$ group per molecule, wherein R$^{5e}$ is hydrogen, C$_1$-C$_{12}$ alkyl, aryl, Na, K, Li, or NH$_4$.

14. The method of claim 1, wherein the silicon containing compound is water soluble and polyethylenimine based.

15. The method of claim 14, wherein the silicon containing compound is made by functionalizing a polyethylenimine backbone with either or both of silane compounds III and IV, and optionally with either of hydrophobe compounds V and VI—

(III)

(IV)

(V)

(VI)

wherein:
Z$^1$ and Z$^3$ are each independently a hydrocarbon group having a number of carbons in the range of 1 to 20 carbons;
Z$^2$ is chosen from H, optionally substituted C$_1$-C$_{20}$ alkyl, optionally substituted C$_1$-C$_6$ aryl, optionally substituted C$_7$-C$_{20}$ aralkyl, optionally substituted C$_2$-C$_{20}$ alkenyl, Group I metal ion, Group II metal ion and NR$^1$$_4$; wherein each R$^1$ is independently chosen from H, optionally substituted C$_1$-C$_{20}$ alkyl, optionally substituted $C_6$-$C_{12}$ aryl, optionally substituted $C_7$-$C_{20}$ aralkyl, or optionally substituted $C_2$-$C_{20}$ alkenyl; and X is F, Cl, Br or I.

16. The method of claim 1, wherein the silicon containing compound is a polymer or polymeric reaction product comprising a unit according to Formula VII and a unit according to Formula VIII— wherein
- $A^3$ and $A^4$ are each independently a first optionally substituted hydrocarbyl radical containing from about 2 to about 40 carbons;
- $Q^3$ is H or second optionally substituted hydrocarbyl radical containing from about 1 to about 20 carbons;
- $R^4$ is H, optionally substituted $C_1$-$C_{20}$ alkyl, optionally substituted $C_6$-$C_{12}$ aryl, optionally substituted $C_7$-$C_{20}$ aralkyl, optionally substituted $C_2$-$C_{20}$ alkenyl, Group I metal ion, Group II metal ion, or $NR^{2a}_4$, wherein each $R^{2a}$ is independently chosen from H, optionally substituted $C_1$-$C_{20}$ alkyl, optionally substituted $C_6$-$C_{12}$ aryl, optionally substituted $C_7$-$C_{20}$ aralkyl, or optionally substituted $C_2$-$C_{20}$ alkenyl;
- $E^4$ is a hydrocarbon group having a number of carbons in a range of 1 to 20 carbons; and
- $J^4$ is chosen from H or a hydrocarbon group having a number of carbons in the range of 1 to 20 carbons, wherein v and w are integers from 0 to 3 and v+w=3.

17. The method of claim 16, wherein the polymer or polymeric reaction product has a weight average molecular weight of at least about 500.

18. The method of claim 1, wherein the Bayer process stream comprises an amount of suspended solids in a range of about 0.01% to about 60% by weight, based on total weight of the Bayer process stream.

19. The method of claim 18 wherein the solids are chosen from iron oxide or aluminosilicate.

20. The method of claim 19 wherein the solids are iron oxide.

* * * * *